United States Patent Office 2,732,267
Patented Jan. 24, 1956

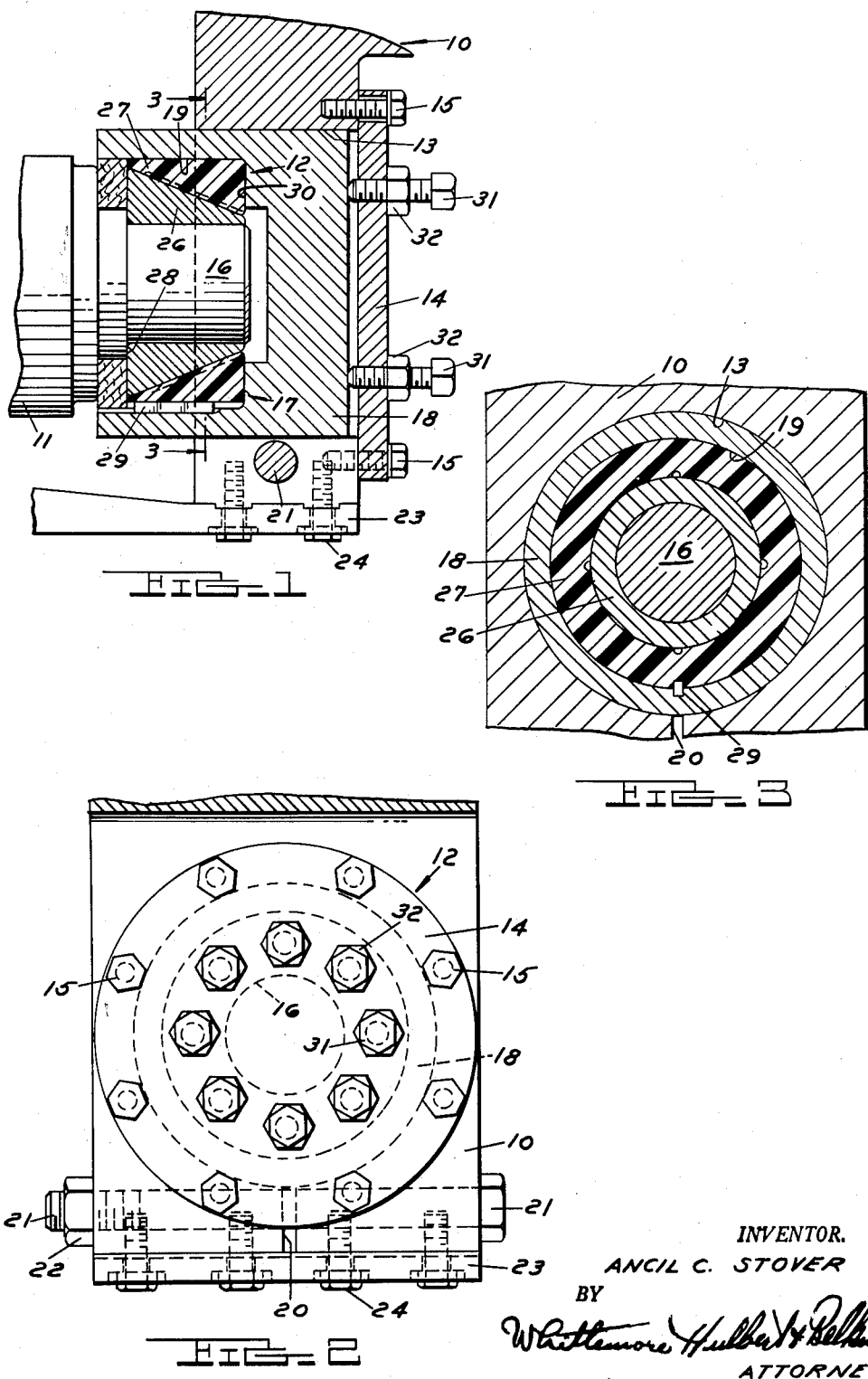

2,732,267

BEARING ASSEMBLY

Ancil C. Stover, Louisville, Ky., assignor to William W. Eisenhauer, William P. Ellwood, Ida J. Eisenhauer, and Leigh E. Eisenhauer, copartners, doing business as The Eisenhauer Manufacturing Company Application October 14, 1953, Serial No. 386,036

4 Claims. (Cl. 308—70)

This invention relates to bearing assemblies and refers more particularly to improvements in bearings of the type used for supporting one part on another for oscillation or pivotal movement.

It is an object of this invention to provide a bearing assembly capable of withstanding exceptionally high impact loads over long periods of use and also capable of withstanding unusually high pre-loading pressures. Thus, the bearing assembly finds particular utility when used under conditions where it is exposed to abnormal impact or shock loads and where lost motion or "bearing play" cannot be tolerated.

It is another object of this invention to provide a bearing assembly having provision for readily adjusting the bearing assembly to assure obtaining the desired pre-loading pressure and to take up any lost motion that may occur in the bearing assembly after long periods of use.

It is a further object of this invention to provide a bearing assembly of the foregoing type which, in addition to being relatively inexpensive to manufacture, possesses a low coefficient of friction and is capable of quiet operation throughout long periods of use with little or no attention on the part of the user.

The foregoing as well as other objects will be made more apparent as this description proceeds especially when considered in connection with the accompanying drawing wherein:

Figure 1 is a longitudinal sectional view through a bearing assembly embodying the features of this invention;

Figure 2 is an end elevational view of the bearing assembly shown in Figure 1; and Figure 3 is a cross sectional view taken on the line 3—3 of Figure 1.

In the drawing, the numeral 10 designates a supporting structure and the numeral 11 indicates a part journaled on the supporting structure for pivotal movement by a bearing assembly 12. The supporting structure 10 has a circular opening 13 therethrough and the outer side of the opening is closed by a plate 14 suitably secured to the supporting structure 10 by fasteners in the form of studs 15.

The bearing assembly 12 comprises a trunnion 16, a bearing 17 for the trunnion 16, and a retainer 18 for the bearing 17. The trunnion 16 extends from the part 11 into the inner end of the opening 13 in coaxial relationship to the opening 13 and has a diameter considerably less than said opening. The retainer 18 is sleeved into the inner end of the opening 13 and is fashioned with an inwardly opening bore 19 coaxially arranged with respect to the trunnion 16. The trunnion projects axially into the bore 19 and the diameter of the bore 19 is sufficiently greater than the diameter of the trunnion 16 to provide an annular space for accommodating the bearing 17.

As shown in Figure 2 of the drawings a slot 20 is formed in the supporting structure 10 at the bottom of the opening 13. The slot 20 extends from the inner surface of the opening 13 to the bottom surface of the supporting structure and also extends for substantially the full axial extent of the opening 13. The slotted portions of the supporting structure are urged toward one another to securely clamp the retainer 18 in place within the opening 13 by a tie bolt 21 and clamping nut 22. The bolt 21 extends through aligned bores formed in the slotted bottom portions of the supporting structure and is threaded at the end opposite the head thereon for receiving the clamping nut 22. A plate 23 is clamped to the bottom surfaces of the slotted portions of the supporting structure 10 in bridging relationship to the slot 20 by studs 24 and assists the bolt 21 in tying the slotted portions of the supporting structure together. The openings in the plates 14 and 23 for respectively receiving the studs 15 and 24 are sufficiently larger in diameter than the studs to permit the slight movement of the slotted portions of the supporting structure required to securely clamp the retainer 18 in place.

The bearing 17 comprises a pair of concentric bearing rings 26 and 27 located within the space provided between the trunnion 16 and inner surface of the bore 19 in the retainer 18. The inner bearing ring 26 is preferably formed of metal such, for example, as hardened steel and the inner surface is fashioned to have a bearing engagement with the trunnion 16. The inner end of the bearing ring 26 engages an annular shoulder 28 formed on the trunnion 16 and the outer surface of the ring 26 is tapered in a radially outward direction from the outer end of the ring 26 to the inner end thereof.

The outer bearing ring 27 is formed of a non-metallic composition material characterized in that it not only has a low coefficient of friction and a relatively low modulus of elasticity in comparision to steel but in addition, is capable of withstanding extremely high impact loads without damage. Particularly satisfactory results have been obtained with a bearing ring 27 formed of phenolic resin compositions such, for example, as phenol formaldehyde, phenol furfural, resorcinal formaldehyde, urea formaldehyde, and other synthetic condensation products commonly known as Bakelite. If desired graphite may be incorporated within the resin in order to provide the ring 27 with self lubricating qualities.

The outer surface of the bearing ring 27 is engageable with the inner surface of the bore 19 in the retainer 18 and a key 29 is provided for securing the ring 27 against movement relative to the retainer 18. The inner surface of the ring 27 is tapered radially outwardly from the outer end of the ring 27 to the inner end thereof and, if desired, may be fashioned with oil grooves. In any case the angle of taper of the inner surface of the ring 27 corresponds to the angle of taper of the outer surface of the ring 26 and these surfaces have a bearing engagement.

It follows from the above that the adjacent surfaces of the concentric bearing rings are frusto-conical in shape and the rings are arranged so that axial movement of the ring 27 in an inward direction relative to the ring 26 pre-loads the journal or takes up any lost motion or play that may exist. As shown in Figure 1 of the drawings the outer end of the ring 27 is engaged by an annular shoulder 30 formed on the retainer at the outer end of the bore 19 so that movement of the retainer 18 axially inwardly imparts a corresponding movement to the outer bearing ring 27 relative to the bearing ring 26.

Axial inward displacement of the retainer 18 relative to the supporting structure 10 to pre-load the journal is accomplished by a plurality of adjusting screws 31 arranged in a circle concentric to the axis of the retainer 18 and threadably engaged in tapped holes formed in the plate 14. The heads of the screws 31 are positioned at the outer side of the plate 14 for convenient manipulation and the inner ends of the screws 31 abut the outer end of the retainer 18. Suitable stop nuts 32 of the elastic type are threadably mounted on the screws 31 in positions to engage the outer surface of the plate 14 and hold the screws 31 in their adjusted positions. It will, of course, be understood that the clamping nut 22 on the tie bolt 21 is loosened prior to adjusting the screws 31 in order to relieve the clamping force on the retainer 18 sufficiently to enable axial movement of the latter.

What I claim as my invention is:

1. A bearing assembly particularly for relatively low speed oscillating loads comprising a retainer having a cylindrical recess, a trunnion extending into said recess in concentric relation thereto, said trunnion having a shoulder spaced inwardly from its outer end, a first bearing ring formed of a non-metallic plastic material characterized by the ability to withstand extremely high impact loads, low coefficient of friction and relatively low modulus of elasticity in comparison with steel, said recess having a transverse surface against which the outer end of said first bearing ring is seated, said first bearing ring having a radially inner frusto-conical bearing surface concentric with said recess and tapered outwardly toward the axis of said trunnion, a second bearing ring formed of metal encircling said trunnion, said second bearing ring having its inner end seated against the shoulder on said trunnion, said second bearing ring being located concentrically within said first bearing ring and having a radially outer frusto-conical bearing surface tapered outwardly toward the axis of said trunnion to the same degree as the radially inner bearing surface of said first bearing ring and having full surface to surface contact therewith, and means operatively connected to one of said retainer and trunnion for relatively moving said retainer and trunnion toward each other to force the radial bearing surfaces of said rings together under substantial pressure to preload said bearing.

2. A bearing assembly particularly for relatively low speed oscillating loads comprising a retainer in the form of a cup having a cylindrical recess, a trunnion extending into said recess in concentric relation thereto, said trunnion having a shoulder spaced inwardly from its outer end, a first bearing ring formed of a non-metallic plastic material characterized by the ability to withstand extremely high impact loads, low coefficient of friction and relatively low modulus of elasticity in comparison with steel, said recess being counter-bored to provide a shoulder against which the outer end of said first bearing ring is seated, said first bearing ring having a radially inner frusto-conical bearing surface concentric with said recess and tapered outwardly toward the axis of said trunnion, a second bearing ring formed of steel encircling said trunnion, said second bearing ring having its inner end engaging the shoulder on said trunnion, said second bearing ring being located concentrically within said first bearing ring and having a radially outer frusto-conical bearing surface tapered outwardly toward the axis of said trunnion to the same degree as the radially inner bearing surface of said first bearing ring and having full surface to surface contact therewith, and means urging said cup toward said trunnion to force the radial bearing surfaces of said rings together under substantial pressure to preload said bearing.

3. A bearing assembly as defined in claim 2, said last-named means comprising a support member having an opening in which said cup is longitudinally movable, a plate overlying the outer end of said opening, and a plurality of adjustable abutment elements extending through said plate and engaging said cup to adjustably urge the latter toward said trunnion.

4. A bearing assembly as defined in claim 3 in which said first bearing ring is formed of Bakelite.

References Cited in the file of this patent

UNITED STATES PATENTS

| 1,054,265 | Baekeland | Feb. 25, 1913 |
| 1,346,377 | Kinney | July 13, 1920 |
| 1,370,623 | Ball | Mar. 8, 1921 |
| 1,690,425 | Norton | Nov. 6, 1928 |
| 1,934,920 | Franzen | Nov. 14, 1933 |

FOREIGN PATENTS

| 761,516 | France | Jan. 5, 1934 |